(12) United States Patent
Kotsuji et al.

(10) Patent No.: US 9,580,076 B2
(45) Date of Patent: Feb. 28, 2017

(54) VEHICLE CONTROLLER

(71) Applicant: JATCO Ltd, Fuji-shi, Shizuoka (JP)

(72) Inventors: Kouichi Kotsuji, Numazu (JP); Hironori Miyaishi, Kawasaki (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 14/915,843

(22) PCT Filed: Aug. 27, 2014

(86) PCT No.: PCT/JP2014/072366
§ 371 (c)(1),
(2) Date: Mar. 1, 2016

(87) PCT Pub. No.: WO2015/037436
PCT Pub. Date: Mar. 19, 2015

(65) Prior Publication Data
US 2016/0214610 A1 Jul. 28, 2016

(30) Foreign Application Priority Data
Sep. 13, 2013 (JP) ................. 2013-190417

(51) Int. Cl.
*B60W 30/18* (2012.01)
*B60K 6/48* (2007.10)
(Continued)

(52) U.S. Cl.
CPC ............... *B60W 30/18* (2013.01); *B60K 6/36* (2013.01); *B60K 6/48* (2013.01); *B60K 6/543* (2013.01);
(Continued)

(58) Field of Classification Search
CPC ......... B60W 30/18054; B60W 30/186; B60W 10/107; B60W 10/02; B60W 10/06;
(Continued)

(56) References Cited

U.S. PATENT DOCUMENTS 8,762,011 B2 * 6/2014 Ishida ............... F16H 61/66259
477/48
2012/0108388 A1 5/2012 Akebono et al.

FOREIGN PATENT DOCUMENTS

JP 08-312741 A 11/1996
JP 2012-097809 A 5/2012

* cited by examiner

*Primary Examiner* — Erin D Bishop
(74) *Attorney, Agent, or Firm* — Foley & Lardner LLP

(57) ABSTRACT

Initial variation learning control is executed when learning condition is satisfied each time of its satisfaction, to absorb initial variations of manufacturing errors or variations of components of second clutch (CL2). When the number of times of total learning is counted and this becomes predetermined number (e.g. five times), initial variation learning control is judged to be converged. On the basis of condition of this convergence, so-called vertical sliding speed control returning belt (50) of variator (V) to LOWEST transmission ratio position is performed. With this, vertical sliding speed control is not performed in state in which excessively large torque acts on second clutch, and durability of belt and pulley is increased. It is therefore possible to prevent vertical sliding speed control from being performed in state in which input torque is predetermined value or greater, and possible to improve response of accelerator operation after performing vertical sliding speed control.

3 Claims, 10 Drawing Sheets

(51) Int. Cl.
*B60K 6/543* (2007.10)
*B60W 10/02* (2006.01)
*B60W 10/107* (2012.01)
*F16H 61/662* (2006.01)
*B60W 10/10* (2012.01)
*B60K 6/36* (2007.10)
*B60W 10/06* (2006.01)
*B60W 30/186* (2012.01)
*F16H 61/00* (2006.01)
*B60W 50/00* (2006.01)

(52) U.S. Cl.
CPC ............ *B60W 10/02* (2013.01); *B60W 10/06* (2013.01); *B60W 10/10* (2013.01); *B60W 10/107* (2013.01); *B60W 20/15* (2016.01); *B60W 30/186* (2013.01); *B60W 30/18054* (2013.01); *F16H 61/66272* (2013.01); *B60W 2050/0088* (2013.01); *B60W 2710/1005* (2013.01); *B60Y 2300/427* (2013.01); *F16H 2061/0087* (2013.01); *Y02T 10/6221* (2013.01); *Y02T 10/76* (2013.01)

(58) Field of Classification Search
CPC ....... F16H 2061/0087; F16H 61/66272; B60Y 2300/427
See application file for complete search history.

though the present invention
VEHICLE CONTROLLER

The present invention relates to a vehicle controller that performs a slip-control of a clutch as a frictional engagement element interposed, together with a variator, between a rotation driving source as a power source and a driving wheel.

BACKGROUND ART

Patent Document 1 has disclosed a technique that, in a vehicle mounting thereon a belt type continuously variable transmission as a transmission, performs a vertical sliding speed control (or a longitudinal slip speed control) that forcibly returns a belt of the belt type continuously variable transmission to a LOWEST position (a LOWEST transmission ratio position) at a time of vehicle stop. Further, Patent Document 2 has disclosed a vehicle controller that performs a slip-control of a clutch as a frictional engagement element interposed between a rotation driving source as a power source and a driving wheel.

The vehicle mounting thereon the belt type continuously variable transmission as the transmission is generally transmission-controlled (speed-controlled) so that, when starting speed reduction, a transmission ratio having been at a relatively higher speed side is changed to a large transmission ratio of a lower speed side, and the belt is returned to the LOWEST transmission ratio position for a subsequent vehicle start by the time the vehicle stops. However, for instance, when the vehicle speed sharply decreases due to a hard braking, such transmission control (speed control) as described above cannot respond to this sharp decrease of the vehicle speed, then there could be a case where the belt is not returned to the LOWEST transmission ratio position at the time of the vehicle stop. Therefore, as disclosed in Patent Document 1, by applying a high hydraulic pressure to a secondary pulley side which is a component of the belt type continuously variable transmission and forcibly sliding or slipping the belt in a radial direction (in a vertical or longitudinal direction) with respect to an unrotated pulley, the belt is returned to the LOWEST transmission ratio position. This transmission control (speed control) is called the vertical sliding speed control (or the longitudinal slip speed control).

In the technique disclosed in Patent Document 2, when performing an engine-used slip mode (hereinafter called a WSC drive mode) in which the vehicle travels using both driving forces of an engine and a motor while slipping the clutch between the motor and the driving wheel, if a vehicle stop state is judged during the above drive mode, Patent Document 2 carries out a vehicle-stop-time transmission torque capacity correction process that sets a command hydraulic pressure of the clutch so that a transmission torque capacity of the clutch becomes almost zero, i.e. a size of the transmission torque capacity of the clutch gets closer and closer to zero, while performing a learning-control of the command hydraulic pressure of the clutch.

In a case where the belt type continuously variable transmission is employed as a transmission with the technique disclosed in Patent Document 1 being a prerequisite and the vertical sliding speed control disclosed in Patent Document 1 is attempted to be performed, when such vertical sliding speed control as described above is performed in a state in which an input torque of a predetermined value or greater acts on the continuously variable transmission, since the belt is returned to the LOWEST transmission ratio position by forcibly sliding or slipping the belt in the radial direction with respect to the unrotated pulley, slip of the belt and the pulley in a circumferential direction (a rotation direction) also occurs. Durability of the pulley and the belt is therefore decreased. This situation must consequently be avoided.

However, since each component or parts of the continuously variable transmission and the clutch has manufacturing errors and assembling errors, it is difficult to perform the vertical sliding speed control in a state in which a magnitude of the input torque is the predetermined value or smaller. In practice, the vertical sliding speed control tends to be performed in a state in which the magnitude of the input torque is the predetermined value or greater. Because of this, there arises a problem of decreasing the durability of the pulley and the belt as mentioned above, and of lowering response of a subsequent accelerator operation which is caused by the fact that the clutch is disengaged too much.

CITATION LIST

Patent Document
Patent Document 1: Japanese Unexamined Patent Application Publication No. JPH08-312741
Patent Document 2: Japanese Unexamined Patent Application Publication No. JP2012-097809

SUMMARY OF THE INVENTION

The present invention was made in view of the above problem. An object of the present invention is therefore to provide a vehicle controller that prevents the vertical sliding speed control from being carried out in the state in which the input torque of a predetermined value or greater acts on the continuously variable transmission, increases the durability of the pulley and the belt and improves the response of the accelerator operation after performing the vertical sliding speed control.

A vehicle controller of the present invention comprises: a rotation driving source generating a driving force of a vehicle; a clutch interposed between the rotation driving source and a driving wheel and generating a transmission torque capacity according to a hydraulic pressure command value; a variator interposed between the driving wheel and the clutch and formed from a primary pulley at an input side and a secondary pulley at an output side and a belt wound around these pulleys; a revolution speed control unit that performs a slip control of the clutch and also performs a revolution speed control of the rotation driving source so that a revolution speed at a rotation driving source side of the clutch is higher than a revolution speed at a driving wheel side of the clutch by a predetermined speed; a vehicle stop state judgment unit that judges a stop state of the vehicle; a torque detection unit that detects an actual torque of the rotation driving source; a lowest-state judgment unit that judges a lowest-state of a transmission ratio of the variator; a vehicle-stop-time transmission torque capacity correction unit that, when the vehicle stop state is judged, while executing a learning control of the hydraulic pressure command value of the clutch, executes a learning control that learns the hydraulic pressure command value of the clutch so that the transmission torque capacity of the clutch gets closer and closer to zero, and sets the hydraulic pressure command value; and a speed control unit that controls the transmission ratio of the variator according to a vehicle operating condition.

The speed control unit is configured to, on the basis of a condition that the learning of the hydraulic pressure command value of the clutch by the vehicle-stop-time transmission torque capacity correction unit is converged, perform a vertical sliding speed control of the variator which changes the transmission ratio of the variator to a low side when the vehicle is in the stop state and the transmission ratio of the variator is not in the lowest-state.

According to the present invention, since the vertical sliding speed control is carried out in a state in which the learning of the hydraulic pressure command value of the clutch is converged, it is possible to prevent the vertical sliding speed control from being carried out in a state in which an excessively larger input torque than assumed acts on the clutch. Thus, slip of the belt with respect to the pulley in a circumferential direction is suppressed during shift to the low side in the vertical sliding control, and an early wear of the belt and the pulley can be avoided, which increases durability of the belt and the pulley. Further, since the clutch is not disengaged too much, lowering of response of an accelerator operation after performing the vertical sliding speed control can be avoided.

EMBODIMENTS FOR CARRYING OUT THE INVENTION

Figure 1:
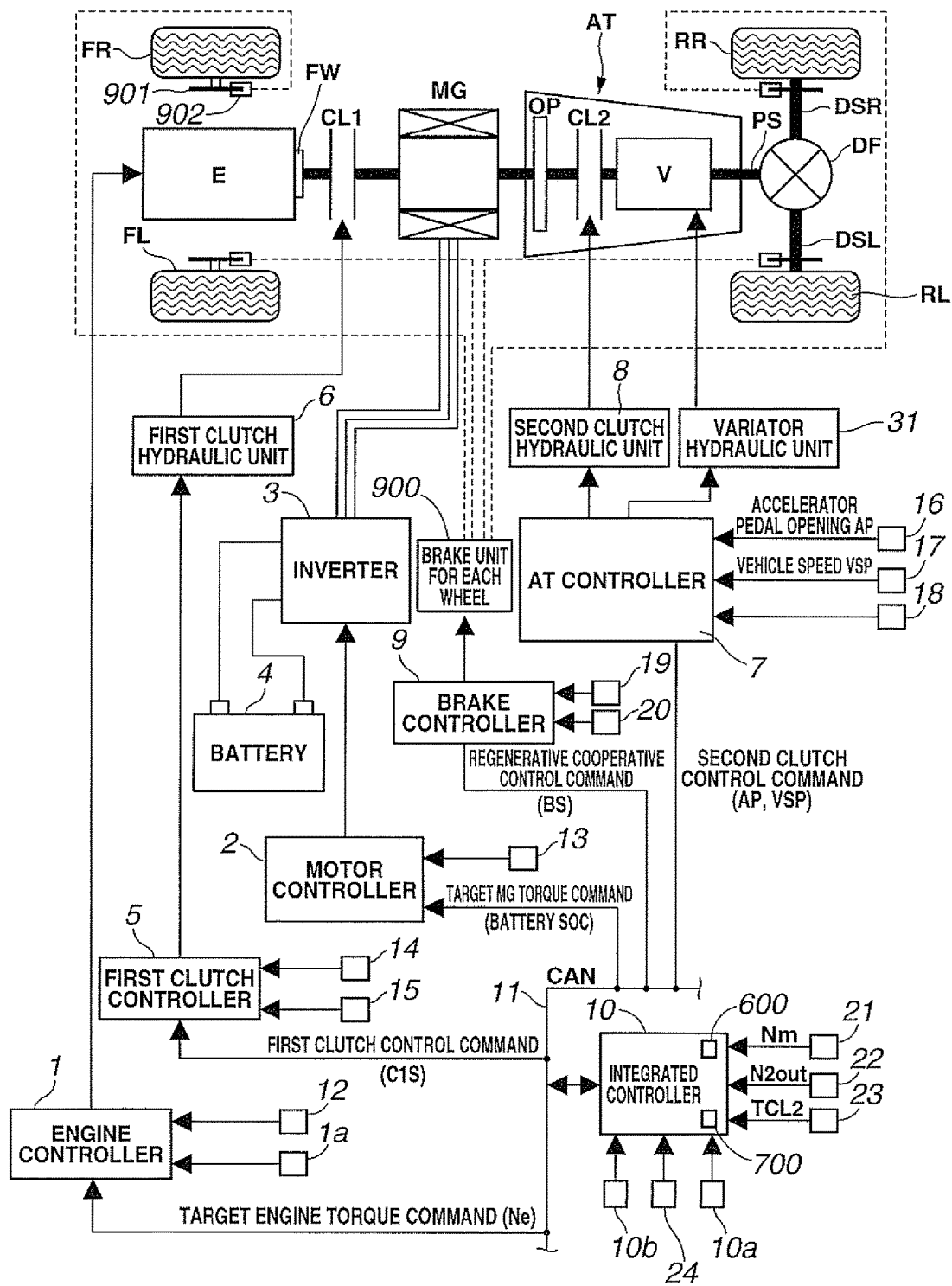
FIG. 1 is a general system diagram showing a rear-wheel-drive hybrid vehicle to which the present invention is applied.

FIGS. 1 to 15 are drawings showing a detailed first embodiment for carrying out the present invention. FIG. 1 is a general system diagram showing a rear-wheel-drive hybrid vehicle to which a controller for the vehicle of the present invention is applied. First, a drive system of the hybrid vehicle will be explained. The hybrid vehicle shown in FIG. 1 has an engine E, a first clutch CL1, a motor/generator MG, an automatic transmission AT, a propeller shaft PS, a differential gear DF, a left drive shaft DSL, a right drive shaft DSR, a rear-left wheel (driving wheel) RL and a rear-right wheel (driving-wheel) RR. The automatic transmission AT includes an oil pump OP, a second clutch CL2 and a variator V. Here, FL is a front-left wheel, and FR is a front-right wheel.

The engine E is, for instance, a gasoline engine, and a valve opening of throttle valve etc. is controlled on the basis of a control command from an after-mentioned engine controller 1. The engine E functions as a rotation driving source that generates a travelling driving force for the vehicle, together with the motor/generator MG. Further, a flywheel FW is provided at an output shaft of the engine E.

The first clutch CL1 is a clutch that is interposed between the engine E and the motor/generator MG. Engagement and disengagement including slip-engagement of the first clutch CL1 are controlled by a control pressure produced by a first clutch hydraulic unit 6 on the basis of a control command from an after-mentioned first clutch controller 5.

The motor/generator MG is a synchronous motor/generator in which a permanent magnet is embedded in a rotor and a stator coil is wound around a stator. On the basis of a control command from an after-mentioned motor controller 2, the motor/generator MG is controlled and driven through application of a three-phase alternating current that is generated by an inverter 3. This motor/generator MG acts as an electric motor that is driven and rotates by receiving power supply from a battery 4 (hereinafter, this state is called a power running state). Also, in a case where the rotor is rotated by an external force, the motor/generator MG acts as a generator that generates an electromotive force at both ends of the stator coil, and is able to charge the battery 4 (hereinafter, this operating state is called a regenerative state). The rotor of this motor/generator MG is connected to an input shaft of the automatic transmission AT through a damper (not shown).

The second clutch CL2 is a clutch that is interposed between the oil pump OP and the variator V in the automatic transmission AT. Engagement and disengagement including slip-engagement of the second clutch CL2 are controlled by a control pressure that is produced by a second clutch hydraulic unit 8 on the basis of a control command from an after-mentioned AT controller 7.

The automatic transmission AT is a transmission with the second clutch CL2 and a well-known so-called belt type continuously variable transmission being main components. The automatic transmission AT is formed from the variator V, having an input side primary pulley, an output side secondary pulley and a belt wound around these both pulleys, a forward/backward travel changing mechanism (not shown) and the oil pump OP connected to a transmission input shaft. The variator V is a variator that controls a transmission ratio according to a vehicle speed and an accelerator opening by a control pressure produced by a variator hydraulic unit 31 on the basis of a control command from the AT controller 7. Here, the second clutch CL2 is not a clutch that is newly added as a special clutch, but a clutch that is engaged at a forward travel of the automatic transmission AT or a brake that is engaged at a backward travel of the automatic transmission AT. Detail of the second clutch CL2 will be explained later.

An output shaft of the automatic transmission AT is connected to the rear-left and rear-right wheels RL, RR through the propeller shaft PS as a vehicle drive shaft, the differential gear DF, the left drive shaft DSL and the right drive shaft DSR. With regard to the first and second clutches CL1 and CL2, for example, a wet multiple disc clutch whose hydraulic flow amount and hydraulic pressure can be continuously controlled by a proportional solenoid is used.

A brake unit 900 has a hydraulic pump and a plurality of electromagnetic valves. The brake unit 900 is configured to secure a hydraulic pressure corresponding to a required braking torque by pressure increase by the pump and to be able to perform so-called brake-by-wire control that controls a wheel cylinder pressure by valve open/closure control of the electromagnetic valve for each wheel. Each of the wheels FR, FL, RR and RF is provided with a brake rotor 901 and a caliper 902, and a frictional braking torque is generated by a brake hydraulic pressure (a brake fluid pressure) supplied from the brake unit 900. Here, as a hydraulic pressure source, a type having an accumulator could be used. Further, instead of a hydraulic brake, a configuration having an electric caliper could be used.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only power of the motor/generator MG as a power source. A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC drive mode) in which the first clutch CL1 is in the engaged state and the second clutch CL2 is slip-controlled then the vehicle travels while including the engine E as the power source. This WSC drive mode is a mode that is capable of achieving a creep drive especially when a state of charge of a battery (SOC) is low or an engine water temperature is low. Here, when changing the mode from the EV drive mode to the HEV drive mode, the first clutch CL1 is engaged, and a start of the engine E is carried out by using torque of the motor/generator MG.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

At a constant speed drive and an acceleration drive, the motor/generator MG works as the generator by using the power of the engine E. At a deceleration drive, by receiving a regenerative brake energy, the motor/generator MG generates the power, and this power is used to charge the battery 4. Further, as another mode, the hybrid drive system has a power generation mode in which the motor/generator MG works as the generator at vehicle stop by using the power of the engine E.

Next, a control system of the hybrid vehicle will be explained. The control system of the hybrid vehicle shown in FIG. 1 has the engine controller 1, the motor controller 2, the inverter 3, the battery 4, the first clutch controller 5, the first clutch hydraulic unit 6, the AT controller 7, the second clutch hydraulic unit 8, the variator hydraulic unit 31, a brake controller 9 and an integrated controller 10. The engine controller 1, the motor controller 2, the first clutch controller 5, the AT controller 7, the brake controller 9 and the integrated controller 10 are connected with each other through a CAN communication line 11 that allows exchange of information between them. Further, as is well known, each controller is formed from a microcomputer etc.

The engine controller 1 inputs information of an engine revolution speed (an engine rpm) from an engine rpm sensor 12, and outputs a command that controls an engine operating point (Ne: the engine revolution speed, Te: an engine torque) to, for instance, a throttle valve actuator (not shown in the drawing) in accordance with a target engine torque command etc. from the integrated controller 10. A detailed engine control will be explained later. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating point (Nm: a motor/generator revolution speed, Tm: a motor/generator torque) of the motor/generator MG to the inverter 3 in accordance with a target motor/generator torque command etc. from the integrated controller 10. This motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs sensor information from a first clutch hydraulic pressure sensor 14 and a first clutch stroke sensor 15, and outputs a command that controls the engagement/disengagement of the first clutch CL1 to the first clutch hydraulic unit 6 in accordance with a first clutch control command from the integrated controller 10. Information of a first clutch stroke CIS is sent to the integrated controller 10 via the CAN communication line 11.

The AT controller 7 inputs sensor information from an accelerator opening sensor 16, a vehicle speed sensor 17, a second clutch hydraulic pressure sensor 18 and an inhibitor switch that outputs a signal corresponding to a position of a shift lever operated by a driver. The AT controller 7 then outputs a command that controls the transmission ratio of the variator V to a target transmission ratio and a command that controls the engagement/disengagement of the second clutch CL2 to the variator hydraulic unit 31 and the second clutch hydraulic unit 8 in an AT hydraulic control valve in accordance with a second clutch control command from the integrated controller 10. Here, information of an accelerator pedal opening APO and a vehicle speed VSP and the inhibitor switch is sent to the integrated controller 10 via the CAN communication line 11.

The brake controller 9 inputs sensor information from a wheel speed sensor 19 for detecting each wheel speed of four wheels and a brake stroke sensor 20. Then, for instance, when a braking torque by only a regenerative braking torque is insufficient for driver's required braking torque determined by a brake stroke BS upon a brake operation by driver's brake pedal depression, the brake controller 9 performs a regenerative brake cooperative control on the basis of a regenerative cooperative control command from the integrated controller 10 so that the shortage of the braking torque is compensated by a mechanical braking torque (a braking torque by a friction brake). Needless to say, not only a brake hydraulic pressure corresponding to the driver's required braking torque, but also a brake hydraulic pressure can be arbitrarily produced in response to other control demand.

The integrated controller 10 is a controller that controls a consumption energy of the whole vehicle, and performs the operation in order for the hybrid vehicle to travel at a maximum efficiency. The integrated controller 10 inputs information from a motor rotation speed sensor 21 that detects a motor rotation speed Nm, a second clutch output rotation speed sensor 22 that detects a second clutch output rotation speed N2out, a second clutch torque sensor 23 that detects a second clutch transmission torque capacity TCL2, a brake hydraulic pressure sensor (a brake fluid pressure sensor) 24, a temperature sensor 10*a* that detects temperature of the second clutch CL2 and a G sensor 10*b* that detects a back-and-forth acceleration, and also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5, the engagement/disengagement control of the second clutch CL2 by the control command to the AT controller 7 and a transmission control (a speed change control) of the variator V.

Furthermore, the integrated controller 10 has a slope load torque equivalent value operating section 600 that calculates an equivalent value of a slope load torque acting on the wheel on the basis of an after-mentioned estimated road slope and a second clutch protection controlling section 700 that when a predetermined condition is satisfied, produces a brake hydraulic pressure (a brake fluid pressure) regardless of driver's brake pedal operating amount.

The slope load torque equivalent value is a value equivalent to a load torque that acts on the wheel when gravity acts on the vehicle so as to make the vehicle move (or roll) backward by the road slope. Regarding the brake that generates the mechanical braking torque at the wheel, by pressing a brake pad to the brake rotor 901 by the caliper 902, a braking torque is generated. Therefore, when the vehicle is made to move backward by the gravity, a direction of the braking torque is a vehicle forward direction (a vehicle forward travelling direction). The braking torque that is identical to this vehicle forward direction is defined as a slope load torque. Since this slope load torque can be determined by the road slope and inertia of the vehicle, the slope load torque equivalent value is calculated on the basis of a vehicle weight etc. previously set in the integrated controller 10. However, the slope load torque equivalent value could be the slope load torque as it is, or the slope load torque equivalent value might be a value obtained by adding or subtracting a predetermined value.

The second clutch protection controlling section 700 calculates a braking torque minimum value (a braking torque that is greater than the above slope load torque) by which so-called roll back, meaning that the vehicle moves or rolls backward, can be avoided when the vehicle stops on a slope road. The second clutch protection controlling section 700 then outputs the braking torque minimum value as a control lower limit value to the brake controller 9 when a predetermined condition is satisfied (when the vehicle stops with the road slope being equal to or greater than a predetermined value).

Here, the brake hydraulic pressure is applied to only the rear wheel that is the driving wheel. However, the brake hydraulic pressure could be applied to four wheels with consideration given to distribution to the front and rear wheels, or the brake hydraulic pressure might be applied to only the front wheel.

On the other hand, when the predetermined condition is not satisfied, the second clutch protection controlling section 700 outputs a command that gradually reduces the braking torque. Further, when the predetermined condition is satisfied, the second clutch protection controlling section 700 outputs, to the AT controller 7, a command that forbids an output of transmission torque capacity control to the second clutch CL2.

Figure 2:
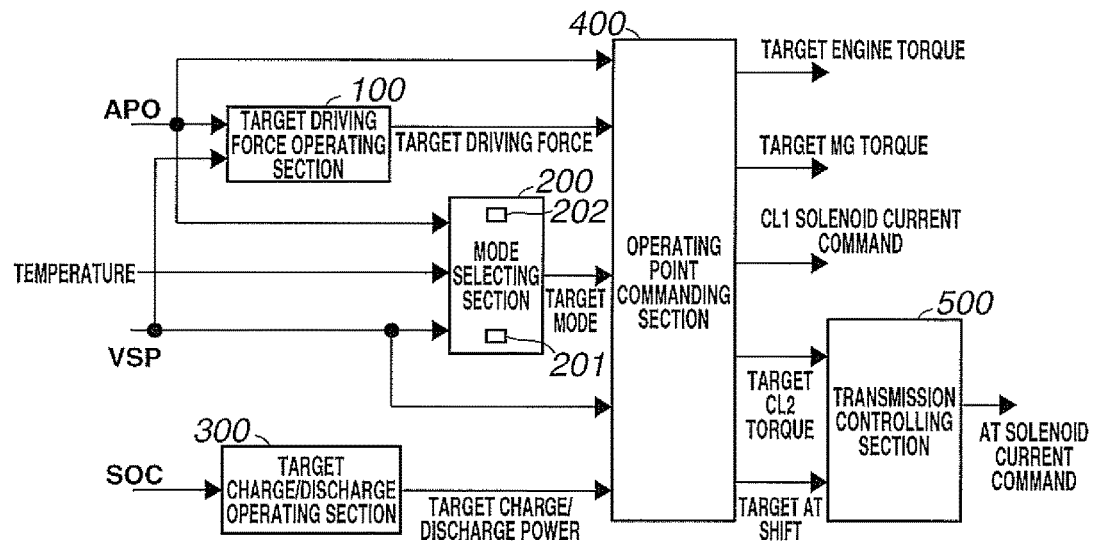
FIG. 2 is a control block diagram showing operation processes in an integrated controller of FIG. 1.

Next, control operated in the integrated controller 10 will be explained with reference to the control block diagram in FIG. 2. The operation in the integrated controller 10 is executed for instance at a control cycle period 10 msec. The integrated controller 10 has a target driving force operating section 100, a mode selecting section 200, a target charge/discharge operating section 300, an operating point commanding section 400 and a transmission controlling section (a speed change controlling section) 500.

Figure 3:
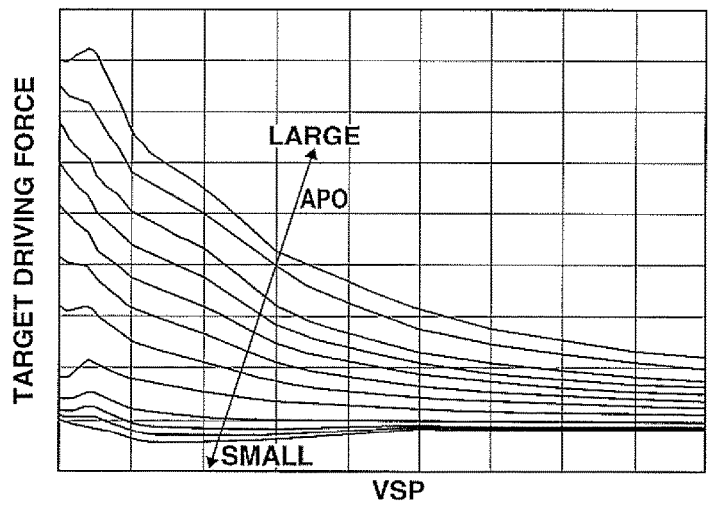
FIG. 3 is a drawing showing an example of a target driving force map used for calculation of a target driving force in a target driving force operating section of FIG. 2.

The target driving force operating section 100 calculates a target driving force tFoO (driver's required driving force) on the basis of the accelerator pedal opening APO and the vehicle speed VSP using the target driving force map shown in FIG. 3.

The mode selecting section 200 has a road slope estimation operating section 201 that estimates the slope of road on the basis of a detection value of the G sensor 10*b*. The road slope estimation operating section 201 calculates an actual acceleration from an average etc. of acceleration of the wheel speed detected by the wheel speed sensor 19, and estimates the road slope on the basis of a difference between this calculation result and the G sensor detection value.

Figure 4:
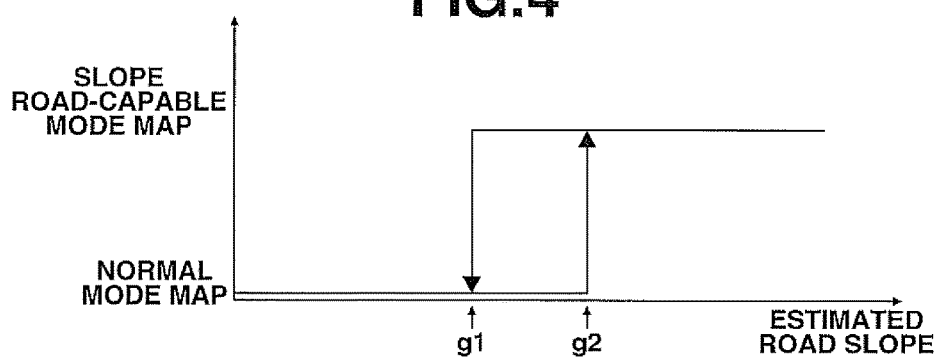
FIG. 4 is a drawing showing a relationship between a mode map and an estimated slope in a mode selecting section of FIG. 2.

The mode selecting section 200 further has a mode map selecting section 202 that selects either one of two mode maps (described later) on the basis of the estimated road slope. FIG. 4 is a schematic diagram showing selection logic of the mode map selecting section 202. The mode map selecting section 202 changes the map from a normal mode map to a slope road-capable mode map when the estimated slope becomes equal to or greater than a certain value g2 in a condition where the normal mode map is selected. On the other hand, the mode map selecting section 202 changes the map from the slope road-capable mode map to the normal mode map when the estimated slope becomes less than a certain value g1 (<g2) in a condition where the slope road-capable mode map is selected. That is to say, a hysteresis is set for the estimated slope (for the change between the both mode maps), thereby preventing a hunting upon the map change.

Figure 5:
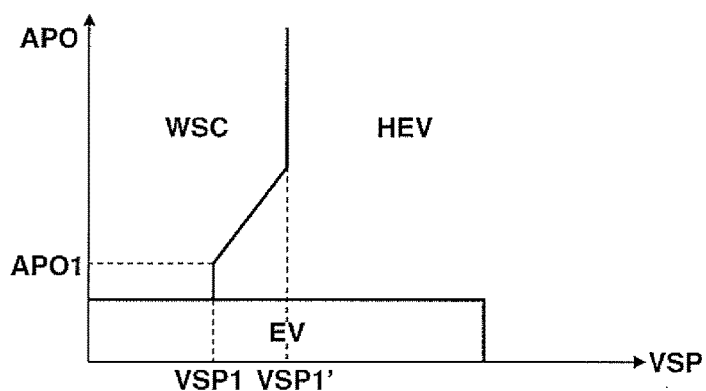
FIG. 5 is a drawing showing a normal mode map used for selection of a target mode in the mode selecting section of FIG. 2.
Figure 6:
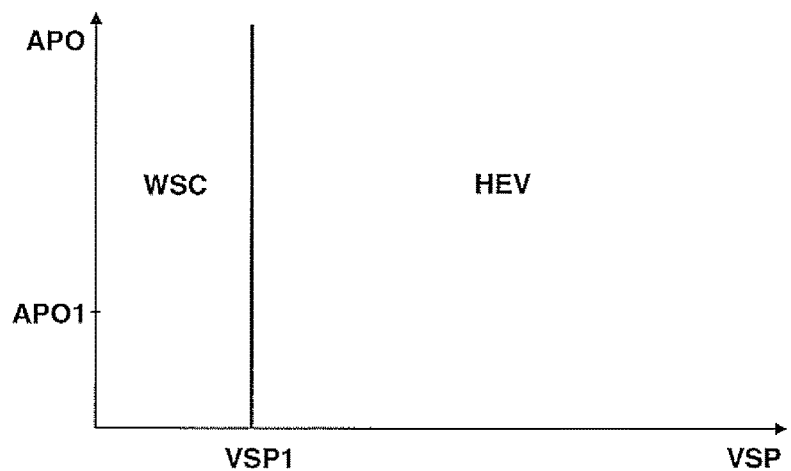
FIG. 6 is a drawing showing an MWSC-capable mode map used for selection of a target mode in the mode selecting section of FIG. 2.

Next, the mode map will be explained. As the mode map, the normal mode map that is selected when the estimated slope is less than the certain value, and the slope road-capable mode map that is selected when the estimated slope is greater than or equal to the certain value, are set. FIG. 5 illustrates the normal mode map. FIG. 6 illustrates the slope road-capable mode map.

In the normal mode map, the EV drive mode, the WSC drive mode and the HEV drive mode are set, then on the basis of the accelerator pedal opening APO and the vehicle speed VSP, the target mode is operated. However, even if the EV drive mode is selected, in a case where the battery SOC is smaller than or equal to a predetermined value, the target mode becomes the HEV drive mode or the WSC drive mode compulsorily or forcibly.

In the normal mode map in FIG. 5, with regard to an HEV→WSC change line, in an area where the accelerator pedal opening APO is less than a predetermined accelerator opening APO1, the HEV→WSC change line is set in an area where the vehicle speed VSP is lower than a lower limit vehicle speed VSP1 that is a vehicle speed at which an engine rpm becomes smaller than an idle speed of the engine E when the transmission ratio of the automatic transmission AT is at a low speed side. In an area where the accelerator pedal opening APO is the predetermined accelerator opening APO1 or greater, since a great driving force is required, the WSC drive mode is set up to an area of a vehicle speed VSP1' that is higher than the lower limit vehicle speed VSP1. However, this drive mode change control is configured so that when the battery SOC is low and the EV drive mode cannot be achieved, even in a case of the vehicle start, the WSC drive mode is selected.

Here, there is a case where when the accelerator pedal opening APO is large, it is difficult to achieve this request of the large accelerator pedal opening APO by the engine torque corresponding to the engine rpm around the idle speed and the torque of the motor/generator MG. Regarding the engine torque, as the engine rpm increases, more torque can be outputted. For this reason, even if the WSC drive mode is carried out up to a higher vehicle speed than the lower limit vehicle speed VSP1, by increasing the engine rpm and outputting the greater torque, the mode can change from the WSC drive mode to the HEV drive mode in a short time. This case corresponds to the WSC area that is extended or increased up to the vehicle speed VSP1' in FIG. 5.

As for the slope road-capable mode map, an EV drive mode area is not set in the slope road-capable mode map. This point is different from the normal mode map. Further, in the slope road-capable mode map, a WSC drive mode area is not changed according to the accelerator pedal opening APO, but is set only by the lower limit vehicle speed VSP1. This point is also different from the normal mode map.

Figure 7:
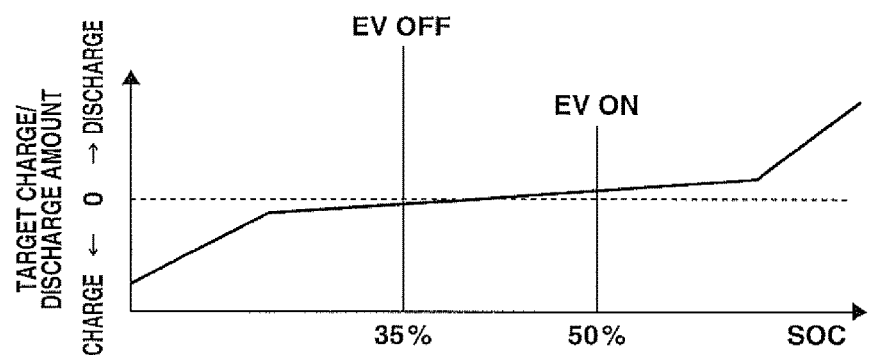
FIG. 7 is a drawing showing an example of a target charge/discharge amount map used for calculation of a target charge/discharge power in a target charge/discharge operating section of FIG. 2.

The target charge/discharge operating section 300 calculates a target charge/discharge power tP on the basis of the battery SOC using a target charge/discharge amount map shown in FIG. 7. In the target charge/discharge amount map, an EVON line (an MWSCON line) for permitting the EV drive mode is set at SOC=50%, and an EVOFF line (an MWSCOFF line) for forbidding the EV drive mode is set at SOC=35%.

When SOC is "SOC≥50%", the EV drive mode area appears in the normal mode map of FIG. 5. Once the EV drive mode area appears in the mode map, this area continues appearing until SOC falls below 35%.

When SOC is "SOC<35%", the EV drive mode area disappears in the normal mode map of FIG. 5. When the EV drive mode area disappears in the mode map, this area continues disappearing until SOC reaches 50%.

The operating point commanding section 400 calculates a transitional target engine torque, a transitional target motor/generator torque, a transitional target second clutch transmission torque capacity TCL2*, a transitional target transmission ratio of the automatic transmission AT and a transitional first clutch solenoid current command on the basis of the accelerator pedal opening APO, the target driving force tFoO (the driver's required driving force), the target mode, the vehicle speed VSP and the target charge/discharge power tP, as attainment targets of these operating points. Further, the operating point commanding section 400 is provided with an engine start controlling section that starts the engine E when changing the mode from the EV drive mode to the HEV drive mode.

The shift controlling section 500 controls drive of a solenoid valve in the automatic transmission AT to attain the target second clutch transmission torque capacity TCL2* and the target transmission ratio along a shift schedule set in a shift map. The shift map is a map in which the target transmission ratio is preset according to the vehicle speed VSP and the accelerator pedal opening APO. Here, detail of the second clutch hydraulic unit 8 that controls the second clutch CL2 is shown in FIG. 11.

Figure 11:
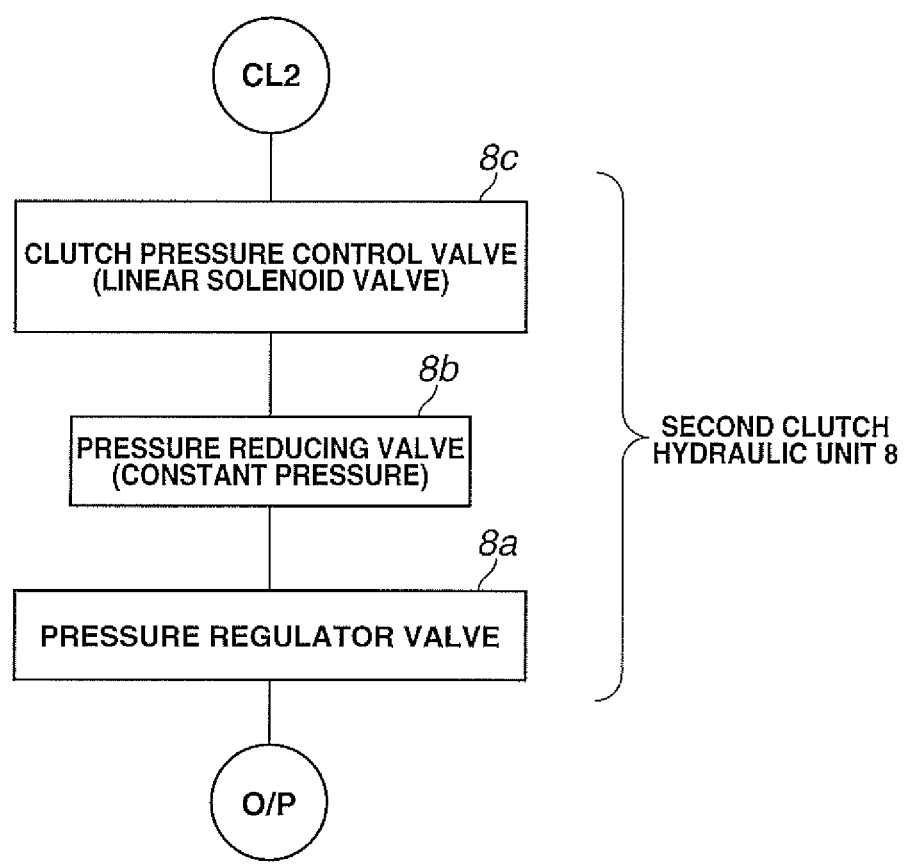
FIG. 11 is an explanatory drawing showing a detailed configuration of a second clutch hydraulic unit of FIG. 1.

In the present embodiment, as shown in FIG. 11, a pressure regulator valve 8a, a pressure reducing valve 8b and a clutch pressure control valve 8c are provided in the second clutch hydraulic unit S shown in FIG. 1, and a hydraulic pressure produced by the oil pump O/P is supplied to the second clutch CL2. The clutch pressure control valve (a linear solenoid valve) 8c that is a main element of the second clutch hydraulic unit 8 is controlled by the AT controller 7 of FIG. 1. The clutch pressure control valve 8c is duty-controlled by a command from the AT controller 7. By this control, the hydraulic pressure supplied to the second clutch CL2 as a working fluid pressure (a hydraulic fluid pressure) is controlled. Here, normally, a driving command according to a throttle opening is inputted to the clutch pressure control valve 8c.

<WSC Drive Mode>

Next, the WSC drive mode will be explained in detail. The WSC drive mode is characterized by the maintaining of an engine working state, and response to a change of the driver's required torque is high. More specifically, the first clutch CL1 is fully engaged, and the second clutch CL2 is slip-controlled as the transmission torque capacity TCL2 according to the driver's required torque, then the vehicle travels using the driving force of the engine E and/or the motor/generator MG.

In the hybrid vehicle shown in FIG. 1, an element such as a torque converter that absorbs a difference of rotation is not present. Thus, if the first clutch CL1 and the second clutch CL2 are fully engaged respectively, the vehicle speed is determined in accordance with the engine revolution speed. In order to maintain self-rotation of the engine E, the engine E has the lower limit determined by the idle speed. When so-called idle-up operation is carried out during engine warm-up, the idle speed, i.e. the lower limit tends to further rise. Furthermore, in the condition where the driver's required torque is high, there is a case where a rapid mode change to the HEV drive mode cannot be achieved.

On the other hand, in the EV drive mode, since the first clutch CL1 is disengaged, there is no limit on the lower limit of the above engine revolution speed. However, when the traveling by the EV drive mode is difficult due to a limit by the battery SOC, or when the driver's required torque cannot be attained by only the motor/generator MG, there is no other way than to produce a stable torque by the engine E.

Therefore, when the vehicle is in a low vehicle speed area where the vehicle speed is lower than the speed corresponding to the above lower limit also in the area where the traveling by the EV drive mode is difficult or the driver's required torque cannot be attained by only the motor/generator MG, the engine revolution speed is maintained at a predetermined lower limit revolution speed, and the second clutch CL2 is slip-controlled, then the WSC drive mode in which the vehicle travels using the engine torque is selected.

Figure 8A:
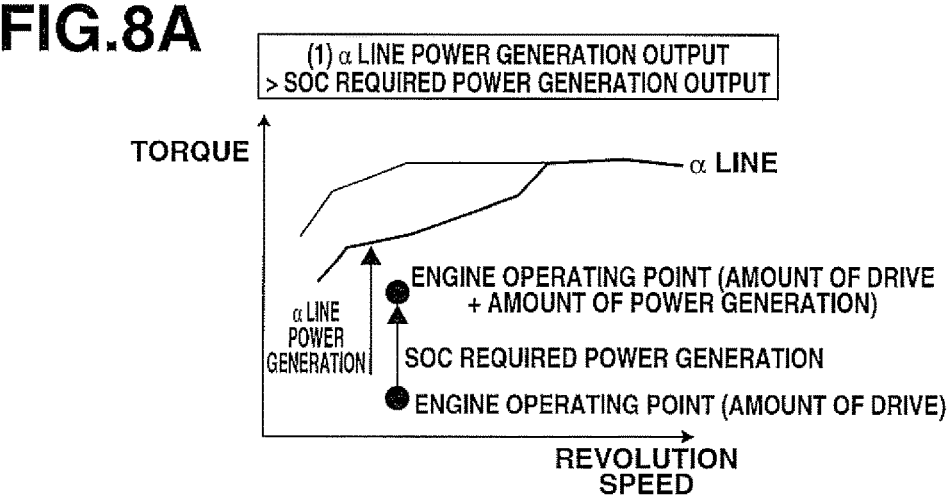
FIGS. 8A to 8C are schematic diagrams showing an engine operating point setting process in a WSC drive mode.
Figure 8B:
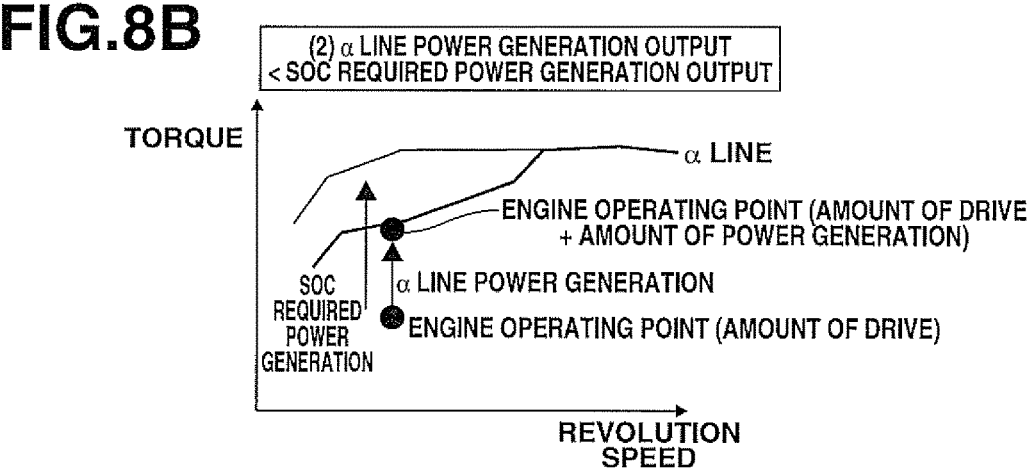
Figure 8C:
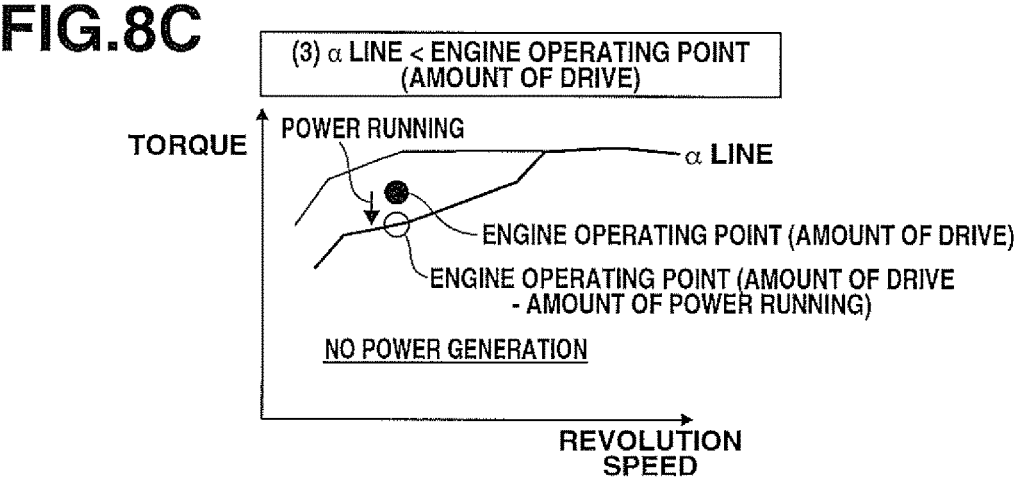
Figure 9:
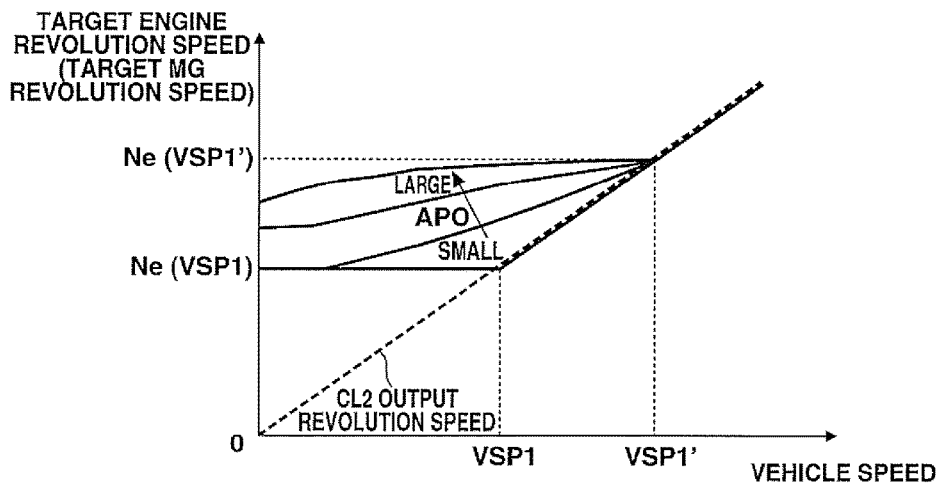
FIG. 9 is a map showing a target engine revolution speed in the WSC drive mode.

FIGS. 8A to 8C are schematic diagrams showing an engine operating point setting process in the WSC drive mode. FIG. 9 is a map showing the target engine revolution speed in the WSC drive mode. In the WSC drive mode, when the driver operates the accelerator pedal, a target engine revolution speed characteristic according to the accelerator pedal opening is selected on the basis of FIG. 9, and the target engine revolution speed according to the vehicle speed is set along this characteristic. And by the engine operating point setting process shown in FIGS. 8A to 8C, the target engine torque corresponding to the target engine revolution speed is calculated.

Here, the operating point of the engine E is defined as a point that is determined by the engine revolution speed and the engine torque. As illustrated in FIGS. 8A to 8C, with respect to the operating point, it is preferable that the operation be executed on a line (hereinafter called an α line) connecting points of high output efficiency.

However, when the engine revolution speed is set as described above, there is a case where the operating point that deviates from the α line is selected depending on driver's accelerator pedal operating amount (the driver's required torque). Therefore, in order to bring the engine operating point closer to the α line, the engine torque is feed-forward controlled to a value based on the α line.

On the other hand, as for the motor/generator MG, a revolution speed feedback control (hereinafter, called a revolution speed control) whose target revolution speed is the set engine revolution speed is executed. Here, since the engine E and the motor/generator MG are in a directly connected state, by controlling the motor/generator MG to maintain the target revolution speed, the revolution speed of the engine E is also automatically feedback-controlled (hereinafter, called a motor ISC control).

At this time, the torque outputted by the motor/generator MG is automatically controlled so that a difference between the target engine torque determined on the basis of the α line and the driver's required torque is compensated. The motor/generator MG is provided with a basic or fundamental torque control amount (regeneration/power running) to compensate for this difference, and further is feedback-controlled so as to agree with the target engine revolution speed.

In a case where the driver's required torque is smaller than a driving torque on the α line at a certain engine revolution speed, when increasing an engine output torque, an engine output efficiency is increased. At this time, by collecting or recovering the energy corresponding to this increased engine output torque by the motor/generator MG, the torque itself that is inputted to the second clutch CL2 becomes the driver's required torque, and also the power generation of good efficiency can be achieved. However, since a torque upper limit by which the motor/generator MG can generate the power is determined by the state of the battery SOC, there is a need to consider a relation of magnitude between a required power generation output (SOC required power generation power) determined by the battery SOC and a difference (a line power generation power) between a torque at a current operating point and a torque on the α line.

FIG. 8A is the schematic diagram of a case where the α line power generation power is greater than the SOC required power generation power. Since the engine output torque cannot be increased to the SOC required power generation power or greater, the operating point cannot be moved on the α line. However, by moving the operating point to a higher efficiency point, a fuel efficiency is improved.

FIG. 8B is the schematic diagram of a case where the α line power generation power is smaller than the SOC required power generation power. If the α line power generation power is within a range of the SOC required power generation power, since the engine operating point can be moved on the α line, in this case, it is possible to generate the power while maintaining the operating point of a highest fuel efficiency.

FIG. 8C is the schematic diagram of a case where the engine operating point is higher than the α line. When the operating point according to the driver's required torque is higher than the α line, with the proviso that there is a margin for the battery SOC, the engine torque is lowered, and the shortage is compensated by the power running of the motor/generator MG. With this operation, it is possible to attain the driver's required torque while improving the fuel efficiency.

Figure 10:
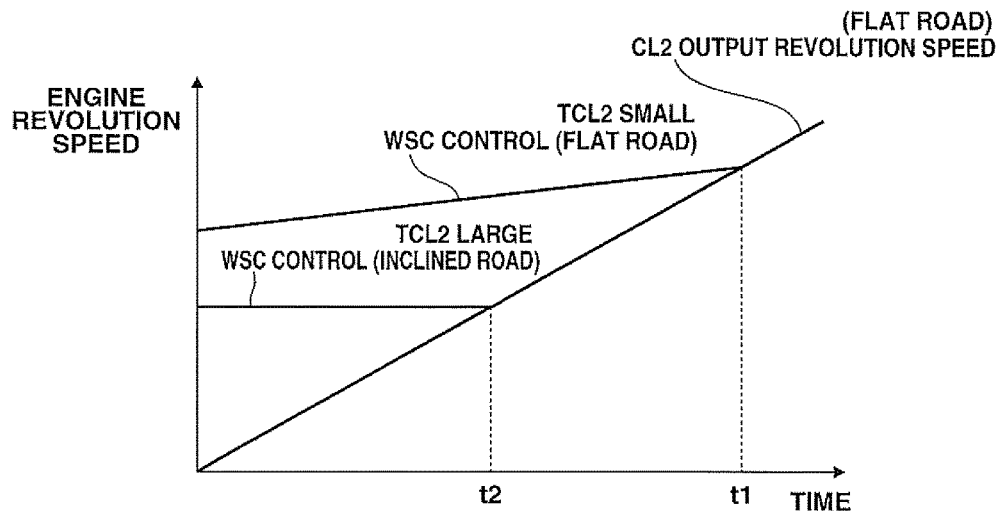
FIG. 10 is a time chart showing change of an engine revolution speed when increasing a vehicle speed in a predetermined state.

Next, a change of the WSC drive mode area according to the estimated slope will be explained. FIG. 10 is an engine revolution speed map when increasing the vehicle speed in a predetermined condition. When the accelerator pedal opening APO is greater than the accelerator opening APO1 on a flat road, the WSC drive mode area is carried out up to a vehicle speed area that is higher than the lower limit vehicle speed VSP1. At this time, as shown in the map of FIG. 9, the target engine revolution speed is gradually increased with increase in the vehicle speed. Then when the vehicle speed reaches a speed corresponding to the vehicle speed VSP1', the slip state of the second clutch CL2 disappears, and the mode is changed to the HEV drive mode.

On a slope road whose estimated slope is greater than the certain slopes (g1 or g2), when attempting to maintain the same vehicle speed increase state as the above operation, the accelerator pedal opening APO becomes large. At this time, the second clutch transmission torque capacity TCL2 becomes large as compared with the flat road. If the WSC drive mode area is extended in this condition as shown in the map of FIG. 5, the second clutch CL2 is maintained in the slip state with a strong engagement force, then there is a risk that a heat value of the second clutch CL2 will be too large. Thus, in the slope road-capable mode map in FIG. 6 that is selected in the case of the slope road whose estimated slope is great, the WSC drive mode area is not extended unnecessarily, but is set up to the area corresponding to the lower limit vehicle speed VSP1. With this setting, excessive heat generation in the WSC drive mode is avoided.

Here, in a case where the revolution speed control is difficult by the motor/generator MG, for example, in a case where the limit by the battery SOC is set, or in a case where controllability (control performance) of the motor/generator MG is not secured due to cryogenic temperature (extremely low temperature), an engine ISC control that performs the revolution speed control by the engine E is carried out.

<MWSC Drive Mode>

Next, the reason why the MWSC drive mode area is set will be explained. In the case where the estimated slope is greater than the certain slopes (g1 or g2), for instance, when attempting to maintain the vehicle in the stop state or in a slight vehicle speed traveling state without using the brake pedal operation, a large driving torque is required as compared with the flat road. This is because that there is a need to maintain the vehicle against the weight load of the vehicle.

From the viewpoint of the avoidance of the heat generation caused by the slip of the second clutch CL2, when there is the margin for the battery SOC, it could be possible to select the EV drive mode. In this case, when the mode area changes from the EV drive mode area to the WSC drive mode area, the engine start is needed. Thus, since the motor/generator MG outputs the driving torque while securing the torque for the engine start, a driving torque upper limit is narrowed or lessened unnecessarily.

Further, when only the torque is outputted to the motor/generator MG and the rotation of the motor/generator MG is stopped or is set to an extremely low revolution speed in the EV drive mode, a lock current flows to a switching element of the inverter (a phenomenon in which the current continues flowing to one switching element occurs), and there is a possibility that durability will be lowered.

Furthermore, at an area (an area of a vehicle speed VSP2 or less) that is lower than the lower limit vehicle speed VSP1 corresponding to the idle speed of the engine E when the transmission ratio of the automatic transmission AT is at a low speed side, the revolution speed of the engine E itself cannot be reduced to be lower than the idle speed. At this time, if the WSC drive mode is selected, there is a risk that the slip amount of the second clutch CL2 is large and this affects the durability of the second clutch CL2.

Especially on the slope road, since the large driving torque is required as compared with the flat road, the transmission torque capacity required of the second clutch CL2 becomes high, and the state of the high slip amount and the high torque is maintained. This tends to cause the deterioration of the durability of the second clutch CL2. In addition, since the increase of the vehicle speed becomes slow, this takes a time to change the mode to the HEV drive mode, and there is a possibility that the heat will be further generated.

Thus, the MWSC drive mode, in which the first clutch CL1 is disengaged with the engine E working, and the revolution speed of the motor/generator MG is feedback-controlled to a target revolution speed that is higher than an output speed of the second clutch CL2 by a predetermined revolution speed while controlling the transmission torque capacity of the second clutch CL2 to the driver's required driving force, is set.

That is to say, the second clutch CL2 is slip-controlled with the rotation state of the motor/generator MG set to a revolution speed that is lower than the idle speed of the engine. At the same time, the control of the engine E is changed to the feedback control with the idle speed being the target revolution speed. In the WSC drive mode, the engine revolution speed is maintained by the revolution speed feedback control of the motor/generator MG. In contrast to this, when the first clutch CL1 is disengaged, the engine revolution speed cannot be controlled to the idle speed by the motor/generator MG. Therefore, an engine self-rotation control is executed by the engine E itself.

By the setting of the MWSC drive mode area, the following effects can be obtained.

(1) Since the engine E is in the working state, there is no need for the motor/generator MG to secure the driving torque required for the engine start, and the driving torque upper limit of the motor/generator MG can be large. More specifically, when thinking of a required driving force axis, the MWSC drive mode can meet the high required driving force as compared with the EV drive mode area.

(2) Since the rotation state of the motor/generator MG is secured, the durability of the switching element etc. can be improved.

(3) Since the motor/generator MG rotates at the revolution speed that is lower than the idle sped, it is possible to reduce the slip amount of the second clutch CL2, then the durability of the second clutch CL2 can be improved.

<Problem of Vehicle Stop State in WSC Drive Mode>

As described above, when the driver depresses the brake pedal and the vehicle is in a vehicle stop state in a state in which the WSC drive mode is selected, a transmission torque capacity equivalent to a creep torque is set for the second clutch CL2, and the revolution speed control is carried out so that the revolution speed of the motor/generator MG directly connected to the engine E is maintained at the idle speed. Since a rotation speed of the driving wheel is zero by the vehicle stop, a slip amount equivalent to the idle speed is generated at the second clutch CL2. If this state continues for a long time, there is a risk that the durability of the second clutch CL2 will be lowered. Thus, it is desirable that the second clutch CL2 should be disengaged when the brake pedal is depressed by the driver and the vehicle stop state continues.

Here, a control that disengages the second clutch CL2 brings a problem. That is, the second clutch CL2 is the wet multiple disc clutch, and the second clutch CL2 generates the transmission torque capacity by the fact that a plurality of clutch plates are pressed by a piston. This piston is provided with a return spring in view of reduction of a drag torque, and if a supply oil pressure to the second clutch CL2 is decreased too much, the piston is returned by the return spring. Then, due to this return of the piston, when the piston and the clutch plate are separated, even if the oil pressure supply is started again, the transmission torque capacity is not generated at the second clutch CL2 until the piston moves and contacts the clutch plate. Thus, there is a risk that a time lag required to start the vehicle (including the roll back due to the time lag) and an engagement shock will occur. Further, even if the supply oil pressure is controlled so that the transmission torque capacity previously becomes an optimal transmission torque capacity, there is a possibility that the optimal transmission torque capacity cannot be set due to an influence of oil temperature and variations in manufacture.

Therefore, in the present embodiment, as part of a process of a vehicle-stop-time transmission torque capacity correction control that sets the transmission torque capacity of the second clutch CL2 to the transmission torque capacity by which the time lag and the engagement shock can be avoided, so-called stand-by pressure learning control process for a command hydraulic pressure of the second clutch CL2 is introduced, and an optimal transmission torque capacity at the time of the vehicle stop is set.

<Vehicle-Stop-Time Transmission Torque Capacity Correction Control Process>

Figure 12:
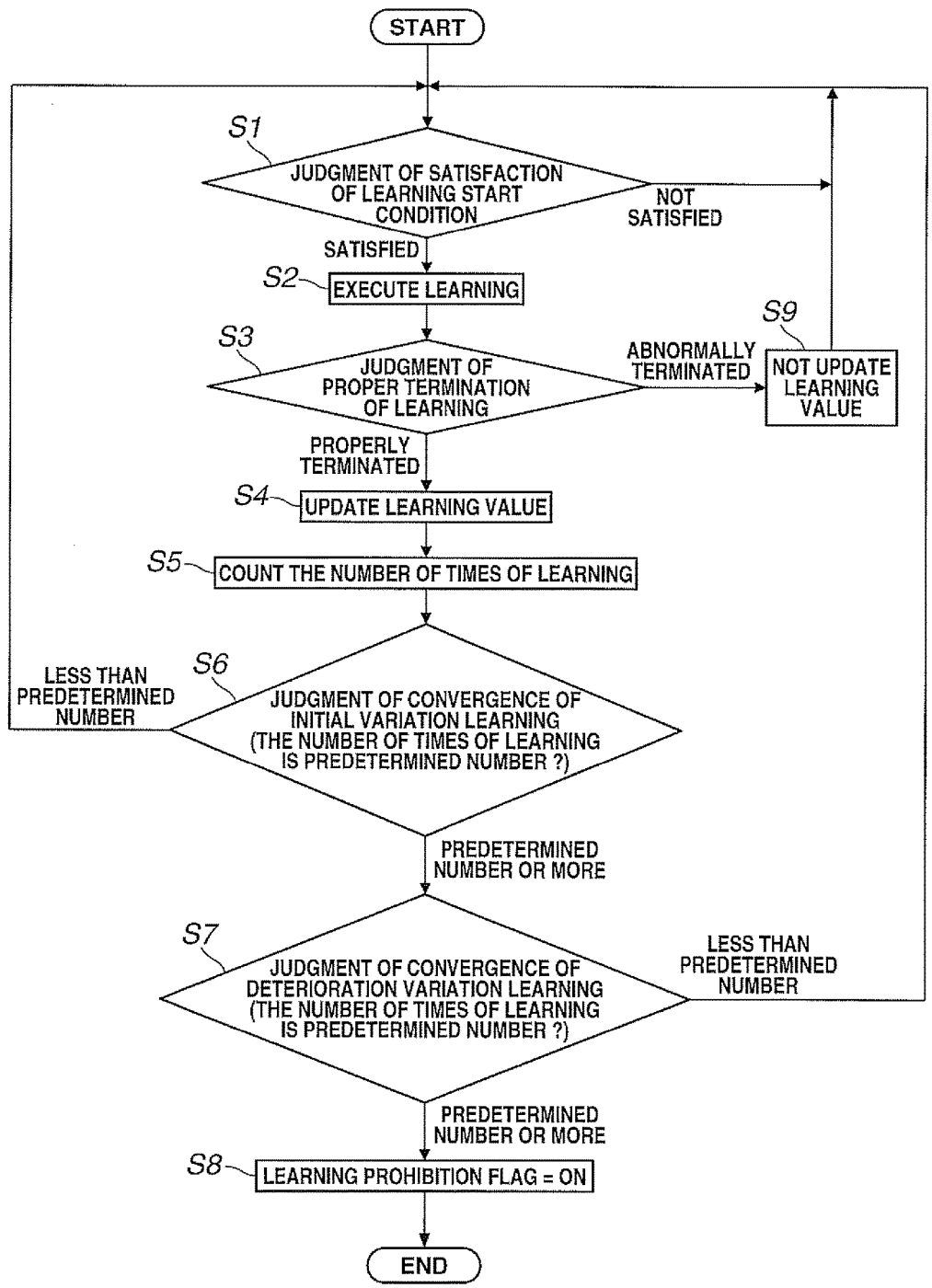
FIG. 12 is a flow chart showing a procedure of a process of a vehicle-stop-time transmission torque capacity correction control.
Figure 13:
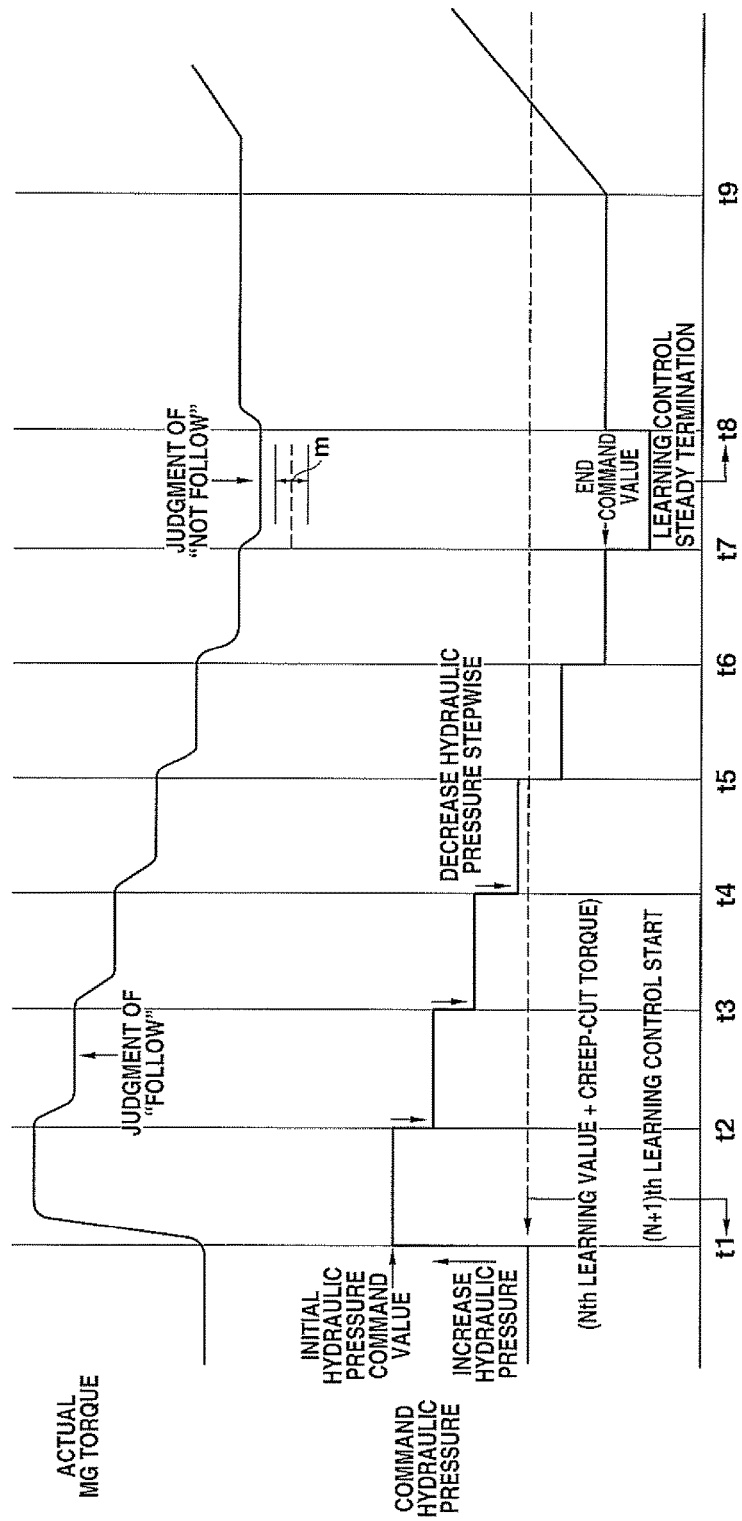
FIG. 13 is a time chart when performing the vehicle-stop-time transmission torque capacity correction control of FIG. 12.

FIG. 12 is a flow chart of the stand-by pressure learning control process for the command hydraulic pressure of the second clutch CL2, executed as the vehicle-stop-time transmission torque capacity correction control process. FIG. 13 is a time chart showing a relationship between the command hydraulic pressure of the second clutch CL2 and an actual MG torque that is the driving torque of the motor/generator MG.

At step S1 in FIG. 12, a judgment is made as to whether or not a start condition of the learning control for the command hydraulic pressure of the second clutch CL2 is satisfied. If the learning control start condition is satisfied, subsequent processes are executed. If the learning control start condition is not satisfied, the routine is returned to step S1. The satisfaction of the learning control start condition here is that the following each condition is satisfied, and the learning control starts after a lapse of a predetermined time. As a matter of course, as described above, the revolution speed control of the motor/generator MG is being performed.

A drive range of D-range or R-range is selected by the shift lever operation.

The vehicle stops (the vehicle is in a halt state) (the vehicle speed is a predetermined speed or less).

Temperature of AFT (working fluid of the automatic transmission) is within a predetermined range.

The second clutch CL2 is in a creep-cut state (a target transmission torque is a predetermined value or less).

The road is flat road (the estimated slope value is a predetermined value or less).

The mode is the EV drive mode.

A learning control prohibition flag is OFF.

At step S2, the learning control for the command hydraulic pressure of the second clutch CL2 is executed. More specifically, as shown in FIG. 13, at time t1, a relatively high initial hydraulic pressure command value is outputted. This initial hydraulic pressure command value is a command value obtained by further adding a predetermined value to a command value that is obtained by adding an amount of a creep-cut torque to an Nth learning value (such value as the transmission torque capacity is almost zero, i.e. a size of the transmission torque capacity gets closer and closer to zero) for the command hydraulic pressure of the second clutch CL2. Adding the initial hydraulic pressure command value as shown in FIG. 13 means that load of the motor/generator MG is increased, and as shown in FIG. 13, the actual MG torque that is the actual driving torque of the motor/generator MG also rises so as to follow the initial hydraulic pressure command value. Here, the actual MG torque is a value that is calculated on the basis of a motor drive current etc. received from the motor controller 2 (which corresponds to a torque detection unit).

Then, after time t2, the hydraulic pressure command value is decreased stepwise in a plurality of stages by a predetermined amount, and a following judgment as to whether a change of the actual MG torque follows a change of the hydraulic pressure command value is made each time the hydraulic pressure command value decreases stepwise. If the change of the actual MG torque follows the change of the hydraulic pressure command value, the hydraulic pressure command value is further decreased (time t2-time t7 in FIG. 13). Afterwards, for instance, when the change of the actual MG torque does not follow the change of the hydraulic pressure command value (non-following judgment) at time t8, a hydraulic pressure command value immediately before time t8 at which the actual MG torque does not follow the change of the hydraulic pressure command value, i.e. a hydraulic pressure command value at time t7, is set as an end command value.

Regarding this non-following judgment, as shown in FIG. 13, for instance, when a value of the actual MG torque, which should follow the change of the hydraulic pressure command value and change according to a variation of the hydraulic pressure command value, does not fall within a judgment range m having a predetermined width in a period from time t7 to time t8, it is judged that the change of the actual MG torque does not follow the change of the hydraulic pressure command value.

Then, a correction value is calculated by multiplying a difference between the end command value and the Nth learning value by a predetermined coefficient, and a value that is obtained by correcting the former Nth learning value by this calculated correction value is set as an (N+1) th learning value. By this calculation and setting, the learning control for the command hydraulic pressure of the second clutch CL2 is terminated. Here, the end command value in itself could be set as the (N+1)th learning value.

Subsequently, at step S3 in FIG. 12, a judgment is made as to whether or not the above learning control is properly terminated. This judgment as to whether or not the learning control is properly terminated is made by the same conditions as those of the satisfaction judgment of the learning control start condition at step S1. If judged that the learning control is properly terminated, a former learning value for the command hydraulic pressure of the second clutch CL2 is updated and stored as a new learning value at a next step S4. On the other hand, if any one of some conditions for the proper termination of the learning control is not satisfied, it is judged that the termination of the former learning control is an abnormal termination. Then, the routine is returned to step S1 without updating the learning value for the command hydraulic pressure of the second clutch CL2 at step S9.

At step S5, on the basis of such proper termination of the learning control as described above, a count value of a counter that counts the number of times the learning control is executed (the number of times of the learning) is counted up by one time each time the learning control is properly terminated. The count of the number of times of the learning here includes two kinds of counts, and each count is performed individually. One is the number of times the learning control is executed (the number of times of total learning), and the other is the number of times of the learning in one travel. The number of times of the total learning is the number of times of the total learning that is stored without resetting the count value even when a key switch is turned OFF. The number of times of the learning in one travel is the number of times of the learning executed from ON of the key switch to OFF of the key switch, and the number of times of the learning in one travel is reset (is set to zero) when the key switch is turned OFF. Therefore, on the basis of such proper termination of the learning control, each count value of the counter for the number of times of the total learning and the number of times of the learning in one travel is counted up by one time.

At steps S6 and S7, a convergence judgment of the learning having been executed is made. Here, regarding the convergence judgment of the learning, a convergence judgment of so-called initial variation learning for absorbing manufacturing errors or variations of each component of the second clutch CL2, and a convergence judgment of so-called deterioration variation learning for absorbing variations caused by secular deterioration (aged deterioration) of each component of the second clutch CL2, are separately made. In the convergence judgment of the initial variation learning at step S6, if the number of times of the total learning becomes a predetermined number (e.g. five times) or more, it is judged that a learning value by the initial variation of the manufacturing errors or the variations of each component of the second clutch CL2 is converged, then the routine proceeds to the next convergence judgment of the deterioration variation learning at step S7. On the other hand, if the number of times of the total learning is less than the predetermined number (e.g. five times), it is judged that the above learning value by the initial variation is not converged, then the routine is returned to step S1, and the learning control is repeated until the learning value is converged.

At step S7, the convergence judgment of the deterioration variation learning is made as the judgment as to whether or not a learning value by the secular deterioration (the aged deterioration) by use of each component of the second clutch CL2 is converged. In this judgement, if the number of times of the learning in one travel after the key switch is turned ON becomes a predetermined number (e.g. one time) or more, it is judged that the deterioration variation learning is converged, then the routine proceeds to a next step S8. At step S8, the learning control prohibition flag is set to ON, and the process is ended. The learning control prohibition flag here becomes OFF when the key switch is turned OFF.

On the other hand, if the number of times of the learning in one travel after the key switch is turned ON is less than the predetermined number (e.g. one time), it is judged that the deterioration variation learning is not converged, then the routine is returned to step S1. And, in the process after step S1, the same learning control process as that executed as the initial variation learning control is repeated as the deterioration variation learning.

By the above learning control for the command hydraulic pressure of the second clutch CL2, the command hydraulic pressure of the second clutch CL2 is set to a newest learning value at time t8 in FIG. 13, namely that the command hydraulic pressure of the second clutch CL2 is set to such value as the transmission torque capacity gets closer and closer to zero so that the second clutch CL2 begins to have the transmission torque capacity. Then, this state is maintained.

As is clear from FIG. 12, regarding the learning control process for the command hydraulic pressure of the second clutch CL2, the initial variation learning is executed as long as the learning control condition is satisfied each time the learning control condition is satisfied until the initial variation learning is converged, i.e. until the number of times of the initial variation learning is five times or more. However, when the initial variation learning is converged, i.e. when the number of times of the initial variation learning is five times or more, after that, the deterioration variation learning control, which is equivalent to the initial variation learning control, is executed only once a trip (only one time per one travel) from ON of the key switch to OFF of the key switch. With this, the number of times of the learning after the initial variation learning control is converged is substantially limited, and a frequency of execution of the learning control can be reduced.

<Vertical Sliding Speed Control of Variator>

Figure 14:
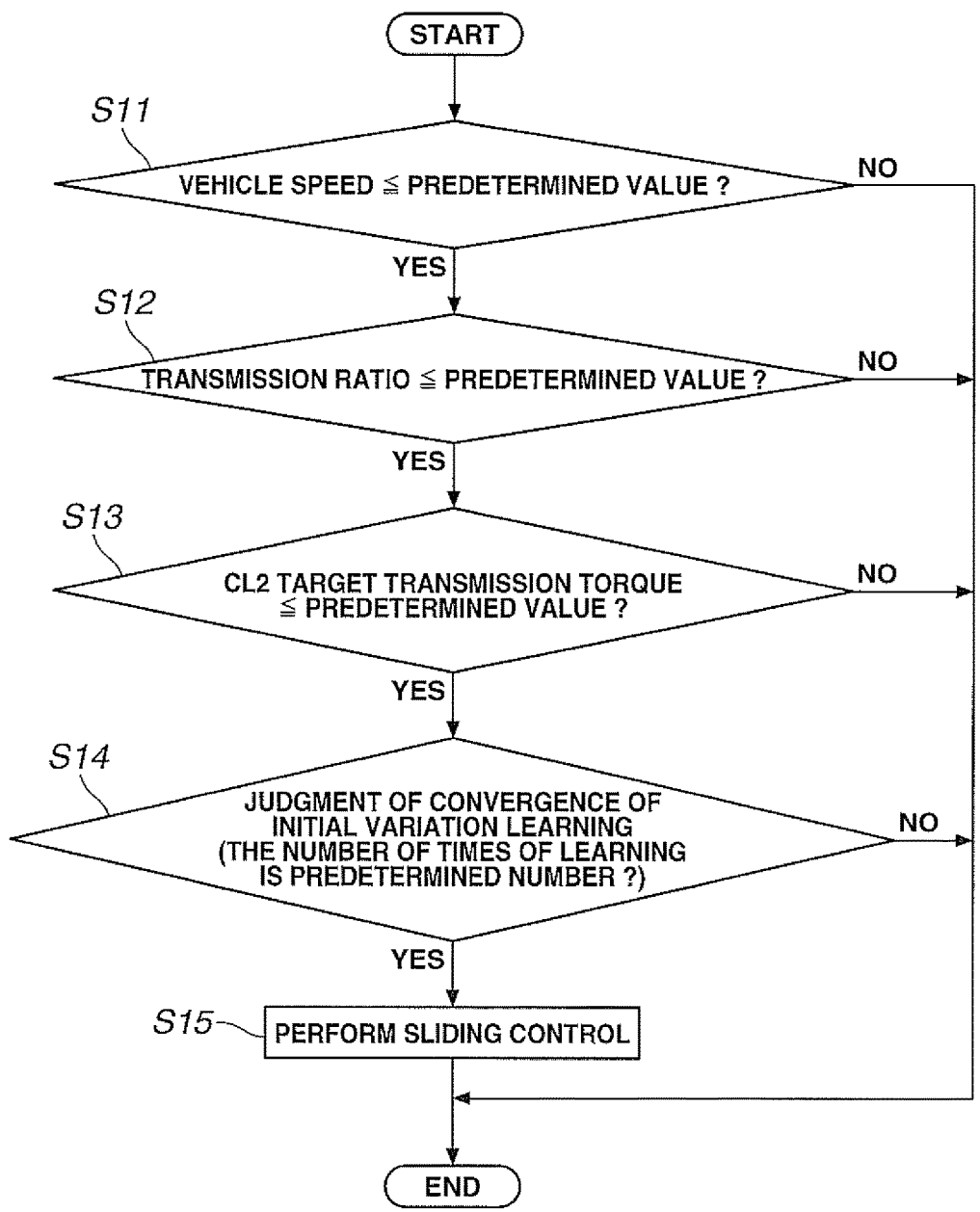
FIG. 14 is a flow chart of a vertical sliding speed control of a variator.
Figure 15:
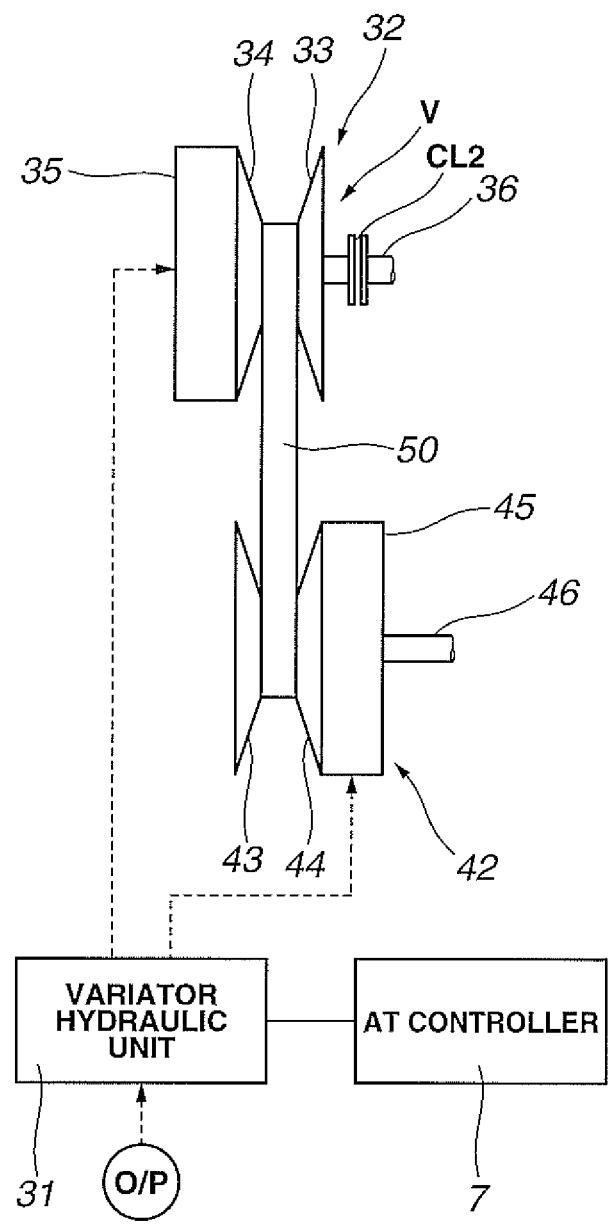
FIG. 15 is an explanatory drawing schematically showing a structure of the variator shown in FIG. 1.

Next, a vertical sliding speed control (or a longitudinal slip speed control) of the variator V that is a main element of the automatic transmission AT shown in FIG. 1 will be explained. FIG. 14 is a flow chart of the vertical sliding speed control of the variator V. FIG. 15 shows a schematic structure of the variator V shown in FIG. 1.

Definition of the vertical sliding speed control of the variator V is previously explained, and the vertical sliding speed control process shown in FIG. 14 is started only after the following each condition is satisfied.

The vehicle stops (the vehicle is in a halt state) (the vehicle speed is a predetermined speed or less).

The transmission ratio of the variator V is at high side (a HIGH side) with respect to a lowest position (a LOWEST position).

The target transmission torque of the second clutch CL2 is a predetermined value or less.

The initial variation learning for the command hydraulic pressure of the second clutch CL2 is converged.

At step S11 in FIG. 14, a judgment is made as to whether or not the vehicle stops, i.e. a judgment is made as to whether or not a current vehicle speed is the predetermined speed or less. If the current vehicle speed is not the predetermined speed or less, the process is ended. At a subsequent step S12, a judgment is made as to whether or not a current transmission ratio of the variator V is a predetermined value or less, i.e. a judgment is made as to whether or not the current transmission ratio of the variator V is at the HIGH side with respect to the LOWEST transmission ratio position. If the current transmission ratio of the variator V is not at the HIGH side with respect to the LOWEST transmission ratio position, the process is ended. At step S13, a judgment is made as to whether or not the target transmission torque of the second clutch CL2 is the predetermined value or less. If the target transmission torque of the second clutch CL2 is not the predetermined value or less, the process is ended.

Further, at step S14 in FIG. 14, a convergence judgment result of the initial variation learning for the command hydraulic pressure of the second clutch CL2 in the process at step S6 of FIG. 12 is added as it is, as a condition. At this step S14, in the same way as step S6 of FIG. 12, a judgment is made as to whether or not the initial variation learning for the command hydraulic pressure of the second clutch CL2 is converged. If the initial variation learning is not converged, the process is ended. In this manner, on the basis of the condition that the judgment results from step S11 to step S14 in FIG. 14 are all "YES", the vertical sliding speed control of the variator V is performed at step S15.

FIG. 15 shows a schematic structure of the variator V shown in FIG. 1. The variator V has a primary pulley 32, a secondary pulley 42 and a metal belt 50 wound around these pulleys 32 and 42.

The primary pulley 32 has a stationary sheave 33 and a movable sheave 34 that can move with respect to the stationary sheave 33 in an axial direction. Further, the primary pulley 32 has an oil chamber 35 into which a hydraulic pressure to move the movable sheave 34 in the axial direction is provided. A V-shaped groove is formed between the stationary sheave 33 and the movable sheave 34, and width of the groove can be varied by moving the movable sheave 34 in the axial direction. An input shaft 36 is connected to the primary pulley 32, and a rotation driving force from the engine E and/or the motor/generator MG shown in FIG. 1 is inputted to the primary pulley 32 through the input shaft 36 and the second clutch CL2.

The secondary pulley 42 has a stationary sheave 43 and a movable sheave 44 that can move with respect to the stationary sheave 43 in an axial direction. Further, the secondary pulley 42 has an oil chamber 45 into which a hydraulic pressure to move the movable sheave 44 in the axial direction is provided. A V-shaped groove is formed between the stationary sheave 43 and the movable sheave 44, and width of the groove can be varied by moving the movable sheave 44 in the axial direction. An output shaft 46 is connected to the secondary pulley 42, and a rotation force of the secondary pulley 42 is transmitted to the propeller shaft PS of FIG. 1 through the output shaft 46.

As mentioned above, the belt 50 is wound around the primary pulley 32 and the secondary pulley 42, and transmits the rotation from the primary pulley 32 to the secondary pulley 42.

Regarding execution of the vertical sliding speed control, it is started on the basis of the condition that the judgment results from step S11 to step S14 in FIG. 14 are all "YES". When these conditions are satisfied, by a command from the AT controller 7, while a primary pressure, which is the hydraulic pressure provided in the oil chamber 35 at the primary pulley 32 side in FIG. 15, is decreased, a secondary pressure, which is the hydraulic pressure provided in the oil chamber 45 at the secondary pulley 42 side, is increased, and the belt 50 is moved in a radial direction of the pulleys 32 and 42 while sliding on the sheaves of these pulleys 32 and 42, then the belt 50 is forcibly returned to the LOWEST transmission ratio position. The vertical sliding speed control is ended after a predetermined time elapses. This predetermined time is set with consideration given to a time required for the belt 50 to be surely returned to the LOWEST transmission ratio position.

Afterwards, at time t9 in FIG. 13, when the driver releases the brake pedal and depresses the accelerator pedal, since a target driving torque is increased, the command hydraulic pressure is increases in response to the increase of the target driving torque. At this time, as described above, since the second clutch CL2 is controlled to such smallest value as the second clutch CL2 begins to have the transmission torque capacity and also the variator V is vertical-sliding-speed-controlled and is set to the LOWEST transmission ratio, the vehicle can start immediately and smoothly.

According to the present embodiment, when performing the learning control of the command hydraulic pressure (so-called stand-by pressure) of the second clutch CL2 in the vehicle stop state, the learning is executed as long as the learning condition is satisfied each time the learning condition is satisfied until the initial variation learning for absorbing the initial variation caused by the manufacturing errors or variations of each component of the second clutch CL2 is converged. However, when the learning is converged (in the present embodiment, when the number of times of the total learning is five times or more), after that, on the basis of the condition that the key switch is turned ON, the deterioration variation learning control with the aim of absorbing the deterioration variation of each component of the second clutch CL2 is executed substantially once (one time). In other words, once the initial variation learning is converged, after that, the deterioration variation learning control is executed only once a trip (only one time per one travel) from ON of the key switch to OFF of the key switch.

This is based on knowledge that since so-called stand-by pressure learning control process is essentially executed in order to absorb the initial manufacturing errors or variations of each component of the second clutch CL2, once the learning to absorb the initial variation is converged, the learning value does not greatly change in a short time after the learning is converged.

Therefore, in the same manner as Patent Document 2, the transmission torque capacity of the second clutch CL2 can be small, thereby suppressing the heat generation and deterioration of the second clutch CL2, and also it is possible to avoid the engagement shock without occurrence of a lag required to generate the transmission torque capacity at the vehicle start. Further, once the learning control for the hydraulic pressure command of the second clutch CL2 is converged, after that, the number of times of the learning is limited and the frequency of execution of the learning control is reduced. It is therefore possible to suppress energy consumption, which contributes to improvement in fuel economy.

In addition, since the vertical sliding speed control, which is a return control to the LOWEST transmission ratio, is performed on the basis of the condition that the initial variation learning control for the command hydraulic pressure of the second clutch CL2 is converged, the vertical sliding speed control of the variator V is not performed in a state in which an excessively larger input torque than assumed acts on the second clutch CL2. As a consequence, it is possible to prevent an occurrence of problem of decreasing durability of the belt and the pulley which is caused by the fact that the belt slips on the sheave of the pulley in a circumferential direction during the shift to the LOW side, and of lowering response of a subsequent accelerator operation which is caused by the fact that the clutch is disengaged too much.

Here, in the present embodiment, as the convergence judgment condition of the initial variation learning control, the number of times of the total learning is five times, and as the convergence judgment condition of the deterioration variation learning control, the number of times of the execution of the learning after the key switch is turned ON is one time. However, these numbers of times are merely an example, and the number of times of the execution of the learning as the learning control convergence judgment condition can be arbitrarily set. Further, instead of the number of times of the execution of the total learning as the convergence judgment condition of the initial variation learning control, mileage (travel distance) can be used, or a difference of the learning value (a difference between former learning value and a latter or current learning value) can be used. In a case where the mileage is used, when a cumulative mileage (a cumulative travel distance) reaches a predetermined distance, it is judged that the initial variation learning control is converged.

Further, although the case, as an example, where the vehicle controller is applied to the hybrid vehicle shown in FIG. 1 is explained in the present embodiment, the vehicle controller could be applied to other vehicles as long as the vehicles are provided with the starter clutch. Further, although FIG. 1 shows an FR-type hybrid vehicle, the vehicle controller could be applied to an FF-type hybrid vehicle. Moreover, in the present embodiment, the vehicle-stop-time transmission torque capacity correction control process is performed in the WSC drive mode. However, the vehicle-stop-time transmission torque capacity correction control process could be performed during execution of other slip control, i.e. as long as the revolution speed control of the motor/generator MG is being carried out.

The invention claimed is:
1. A vehicle controller comprising:
a rotation driving source generating a driving force of a vehicle;
a clutch interposed between the rotation driving source and a driving wheel and generating a transmission torque capacity according to a hydraulic pressure command value;
a variator interposed between the driving wheel and the clutch and formed from a primary pulley at an input side and a secondary pulley at an output side and a belt wound around these pulleys;
a revolution speed control unit that performs a slip control of the clutch and also performs a revolution speed control of the rotation driving source so that a revolution speed at a rotation driving source side of the clutch is higher than a revolution speed at a driving wheel side of the clutch by a predetermined speed;
a vehicle stop state judgment unit that judges a stop state of the vehicle;
a torque detection unit that detects an actual torque of the rotation driving source;
a lowest-state judgment unit that judges a lowest-state of a transmission ratio of the variator;
a vehicle-stop-time transmission torque capacity correction unit that, when the vehicle stop state is judged, while executing a learning control of the hydraulic pressure command value of the clutch, executes the learning control that learns the hydraulic pressure command value of the clutch so that the transmission torque capacity of the clutch gets closer and closer to zero, and sets the hydraulic pressure command value; and a speed control unit that controls the transmission ratio of the variator according to a vehicle operating condition, and the speed control unit being configured to, on the basis of a condition that a target transmission torque capacity of the clutch is a predetermined value or less and the learning of the hydraulic pressure command value of the clutch by the vehicle-stop-time transmission torque capacity correction unit is converged, perform a vertical sliding speed control of the variator which changes the transmission ratio of the variator to a low side when the vehicle is in the stop state and the transmission ratio of the variator is not in the lowest-state.

2. The vehicle controller as claimed in claim 1, wherein:
a convergence judgment of the learning of the hydraulic pressure command value by the vehicle-stop-time transmission torque capacity correction unit is made so that if the number of times of execution of the learning control becomes a predetermined number, the learning is converged.

3. The vehicle controller as claimed in claim 2, further comprising:
a torque detection unit that detects an actual torque of the rotation driving source, and wherein
the vehicle-stop-time transmission torque capacity correction unit is configured to
set, as an initial hydraulic pressure command value, a hydraulic pressure obtained by adding a predetermined amount to an Nth learning value of a hydraulic pressure command value,
set, as an end command value, a hydraulic pressure command value that is a value immediately before the actual torque of the rotation driving source does not follow a change of a hydraulic pressure command value that is decreased stepwise from the initial hydraulic pressure command value, and
set, as an (N+1)th learning value of a hydraulic pressure command value, the end command value or a hydraulic pressure command value obtained by adding a predetermined correction amount to the end command value.

* * * * *